US012771127B2

(12) United States Patent
Lobo et al.

(10) Patent No.: US 12,771,127 B2
(45) Date of Patent: Oct. 20, 2026

(54) ELECTRONIC CONTROL UNIT JUMPSTART FEATURE FOR ELECTRIC VEHICLES

(71) Applicant: Rivian IP Holdings, LLC, Irvine, CA (US)

(72) Inventors: Kyle Lobo, Westchester, CA (US); Sanjeewa Keven Sugatapala, Long Beach, CA (US); Ajay Kumar, Phoenix, AZ (US); Thomas Rocroi, Richmond, CA (US); Joshua Yakel, Rancho Mission Viejo, CA (US); Steven Hang, Long Beach, CA (US); Long Phi Huynh, Brea, CA (US); Tanner Douglas Stinson, Santa Ana, CA (US); Mirisage Niral Sachinthana Fernando, Lake Forest, CA (US); Carl James Trovall, Long Beach, CA (US)

(73) Assignee: Rivian IP Holdings, LLC, Irvine, CA (US)

( * ) Notice: Subject to any disclaimer, the term of this patent is extended or adjusted under 35 U.S.C. 154(b) by 0 days.

(21) Appl. No.: 19/169,937

(22) Filed: Apr. 3, 2025

(65) Prior Publication Data

US 2025/0343411 A1 Nov. 6, 2025

Related U.S. Application Data

(60) Provisional application No. 63/642,608, filed on May 3, 2024.

(51) Int. Cl.

| | |
|---|---|
| ***H02J 1/10*** | (2026.01) |
| ***B60R 16/023*** | (2006.01) |
| ***B60R 16/033*** | (2006.01) |
| *B60L 1/00* | (2006.01) |
| *B60L 53/62* | (2019.01) |
| *H01M 10/42* | (2006.01) |
| *H01M 10/44* | (2006.01) |

(52) U.S. Cl.

CPC .......... *H02J 1/122* (2020.01); *B60R 16/0231* (2013.01); *B60R 16/033* (2013.01); *B60L 1/00* (2013.01); *B60L 53/62* (2019.02); *H01M 10/425* (2013.01); *H01M 10/44* (2013.01)

(58) Field of Classification Search

CPC ......... H02J 1/122; H02J 1/10; B60R 16/0231; B60R 16/033; B60R 16/023; B60L 1/00; H01M 10/425; H01M 10/44; H01M 10/42

See application file for complete search history.

(56) References Cited

FOREIGN PATENT DOCUMENTS

DE 102014207390 A1 * 10/2015 .............. H02J 7/575

* cited by examiner

*Primary Examiner* — Robert L Deberadinis
(74) *Attorney, Agent, or Firm* — Baker Hostetler

(57) ABSTRACT

Methods, systems, and apparatuses for jumpstarting an electric vehicle may include an electronic control unit (ECU) accepting external power connected to an externally accessible location of the vehicle and performing recovery functions. The ECU may conduct diagnostics on the received power and execute jumpstart mode steps if the power is acceptable. These steps may include powering and activating a vehicle access system to authenticate a user, activating latches to allow vehicle access, or providing power to seats or other components in order to obtain battery access. The ECU may determine whether to charge the low voltage battery based on diagnostic results.

20 Claims, 4 Drawing Sheets

100

ELECTRONIC CONTROL UNIT JUMPSTART FEATURE FOR ELECTRIC VEHICLES

CROSS REFERENCE TO RELATED APPLICATION(S)

The present application claims the benefit of U.S. Provisional Application No. 63/642,608, entitled "ELECTRONIC CONTROL UNIT JUMPSTART FEATURE FOR ELECTRIC VEHICLES", filed May 3, 2024, the entirety of which is incorporated herein for reference.

INTRODUCTION

This application is directed to jumpstart features associated with electrically powered apparatuses.

SUMMARY

The disclosed subject matter provides for methods, system, or apparatuses that may be associated with an electronic control unit (ECU) accepting external power connected with the vehicle and performing recovery functions, which may include the ability to charge the low voltage battery. The ECU may conduct diagnostics on the received power and execute jumpstart mode steps if the power is acceptable. These steps may include powering and activating a vehicle access system to authenticate a user, activating latches to allow vehicle access, or providing power to seats or other components for battery access. The ECU may determine whether to charge the low voltage battery based on diagnostic results. If charging is appropriate, the ECU may charge the battery in a controlled manner using voltage, current, or temperature monitoring to ensure charging remains within threshold parameters.

BRIEF DESCRIPTION OF THE DRAWINGS

Certain features of the subject technology are set forth in the appended claims. However, for purpose of explanation, several embodiments of the subject technology are set forth in the following figures.

DETAILED DESCRIPTION

The detailed description set forth below is intended as a description of various configurations of the subject technology and is not intended to represent the only configurations in which the subject technology may be practiced. The appended drawings are incorporated herein and constitute a part of the detailed description. The detailed description includes specific details for the purpose of providing a thorough understanding of the subject technology. However, it will be clear and apparent to those skilled in the art that the subject technology is not limited to the specific details set forth herein and may be practiced without these specific details. In some instances, well-known structures and components are shown in block diagram form in order to avoid obscuring the concepts of the subject technology.

Electric vehicles may not be unlocked or otherwise interface with mechanical keys. Users may gain access through a variety of ways, such as key fobs that communicate with the vehicle wirelessly, mobile phones, or near field communication (NFC) devices (e.g., NFC cards or bands), among other things. A low voltage (LV) battery (e.g., 12V-14V battery) may provide power for the operation of these access systems and when a LV battery is dead it may be difficult to open doors, open charging ports, gain access to a depleted LV battery, or any other operation of the electric vehicle.

The disclosed subject matter provides for methods, system, or apparatuses that may be associated with an electronic control unit (ECU) accepting external power connected with the vehicle and performing recovery functions, which may include the ability to charge the LV battery. As further disclosed herein, the external power may be received by wires that may be routed to an externally accessible location of the vehicle for external power jumpstart.

Figure 1A:
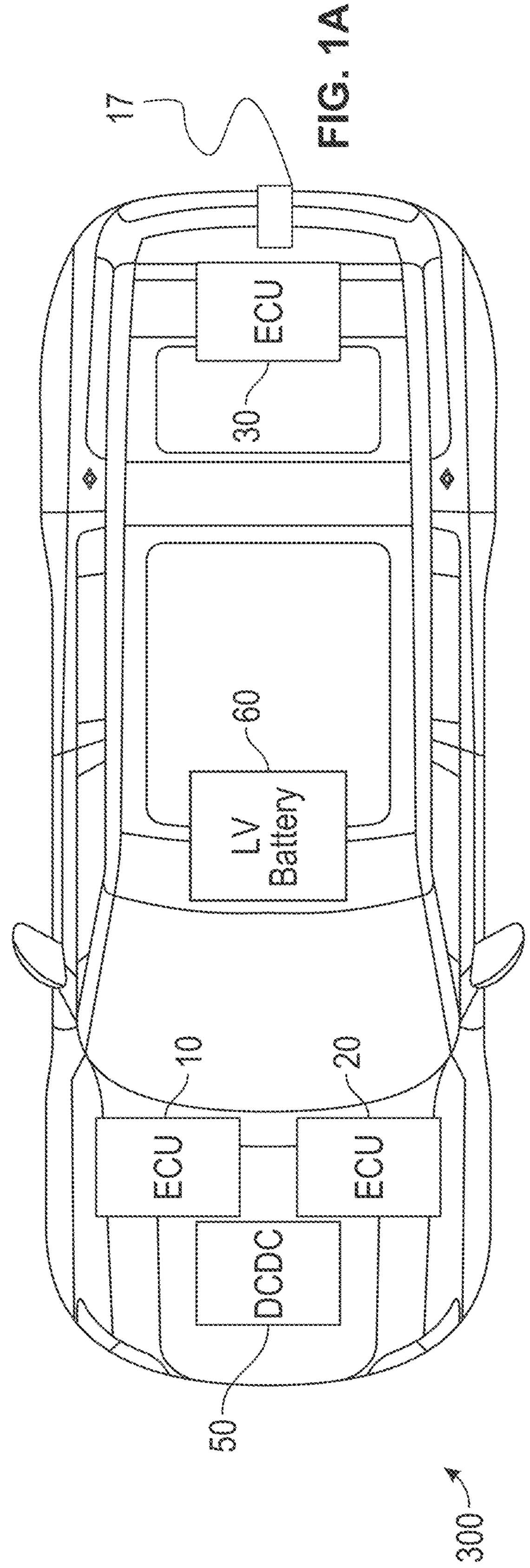
FIG. 1A illustrates an example overhead view of a vehicle with zonal power distribution as described herein.

FIG. 1A illustrates an example overhead view of vehicle 300. As further described herein, vehicle 300 may include electronic control units (ECUs) in front portion 330 of vehicle 300 (e.g., ECU 10 and ECU 20), an ECU in rear portion 340 of vehicle 300 (e.g., ECU 30), direct current to direct current converter (DCDC) 50, low voltage (LV) battery 60 (e.g., 12V battery), or jumpstart access 17, among other things.

Figure 1B:
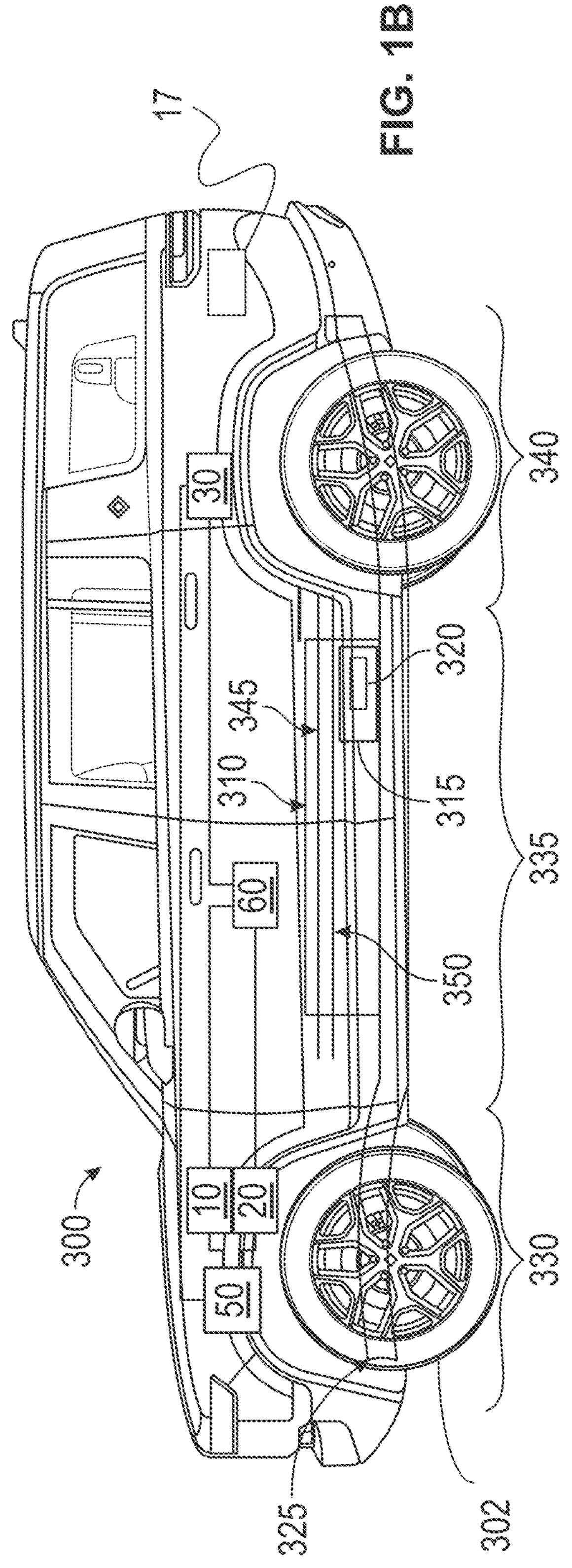
FIG. 1B illustrates an example side view of a vehicle with zonal power distribution as described herein.

FIG. 1B illustrates an example side view of vehicle 300. As shown, the vehicle 300 may include one or more battery packs, such as high voltage (HV) battery pack 310 (e.g., 450V), which may be located near the center body portion 335 of vehicle 300. HV battery pack 310 may be coupled with one or more electrical systems of the vehicle 300 to provide power to the electrical systems. As further described herein, ECU 10, ECU 20, or ECU 30 may be communicatively connected with or have power distributed with each other and may be functionally redundant for power or other operations of electronic components of vehicle 300.

In one or more implementations, the vehicle 300 may be an electric vehicle having one or more electric motors that drive the wheels 302 of the vehicle using electric power from HV battery pack 310. In one or more implementations, the vehicle 300 may also, or alternatively, include one or more chemically-powered engines, such as a gas-powered engine or a fuel cell powered motor. For example, electric vehicles can be fully electric or partially electric (e.g., hybrid or plug-in hybrid). In various implementations, the vehicle 300 may be a fully autonomous vehicle that can navigate roadways without a human operator or driver, a partially autonomous vehicle that can navigate some roadways without a human operator or driver or that can navigate roadways with the supervision of a human operator, may be an unmanned vehicle that can navigate roadways or other pathways without any human occupants, or may be a human operated (non-autonomous) vehicle configured for a human operator.

In the example of FIG. 1B, the vehicle 300 may be implemented as a truck (e.g., a pickup truck) having a battery pack 310. As shown, HV battery pack 310 may include on or more battery modules 315, which may include one or more battery cells 320. However, this is merely illustrative and, in other implementations, HV battery pack 310 may be provided without any battery modules 315 (e.g., in a cell-to-pack configuration).

As shown in FIG. 1B, the vehicle 300 may include a support structure such as a chassis 325 (e.g., a frame, internal frame, or other support structure). The chassis 325 may support various components of the vehicle 300. As shown, the chassis 325 may span a front portion 330 (e.g., a hood or bonnet portion), center body portion 335, and a rear portion 340 (e.g., a trunk, payload, or boot portion) of the vehicle 300 in some implementations. In one or more implementations, HV battery pack 310 may be installed on the chassis 325 (e.g., within one or more of the front portion 330, center body portion 335, or the rear portion 340). As shown, HV battery pack 310 may include or be electrically coupled with one or more one busbars (e.g., one or more current collector elements). In the example of FIG. 1B, the vehicle 300 includes a first busbar 345 and a second busbar 350, either or both of which may include electrically conductive material to connect or otherwise electrically couple the battery module(s) 315 or the battery cell(s) s 320 with other electrical components of the vehicle 300 to provide electrical power to various systems or components of the vehicle 300.

In other implementations, the vehicle 300 may implemented as another type of electric truck, an electric delivery van, an electric automobile, an electric car, an electric motorcycle, an electric scooter, an electric passenger vehicle, an electric passenger or commercial truck, a hybrid vehicle, or other vehicles such as sea or air transport vehicles, planes, helicopters, submarines, boats, or drones, and/or any other movable apparatus having a battery pack 310 (e.g., that powers the propulsion or drive components of the moveable apparatus).

Figure 1C:
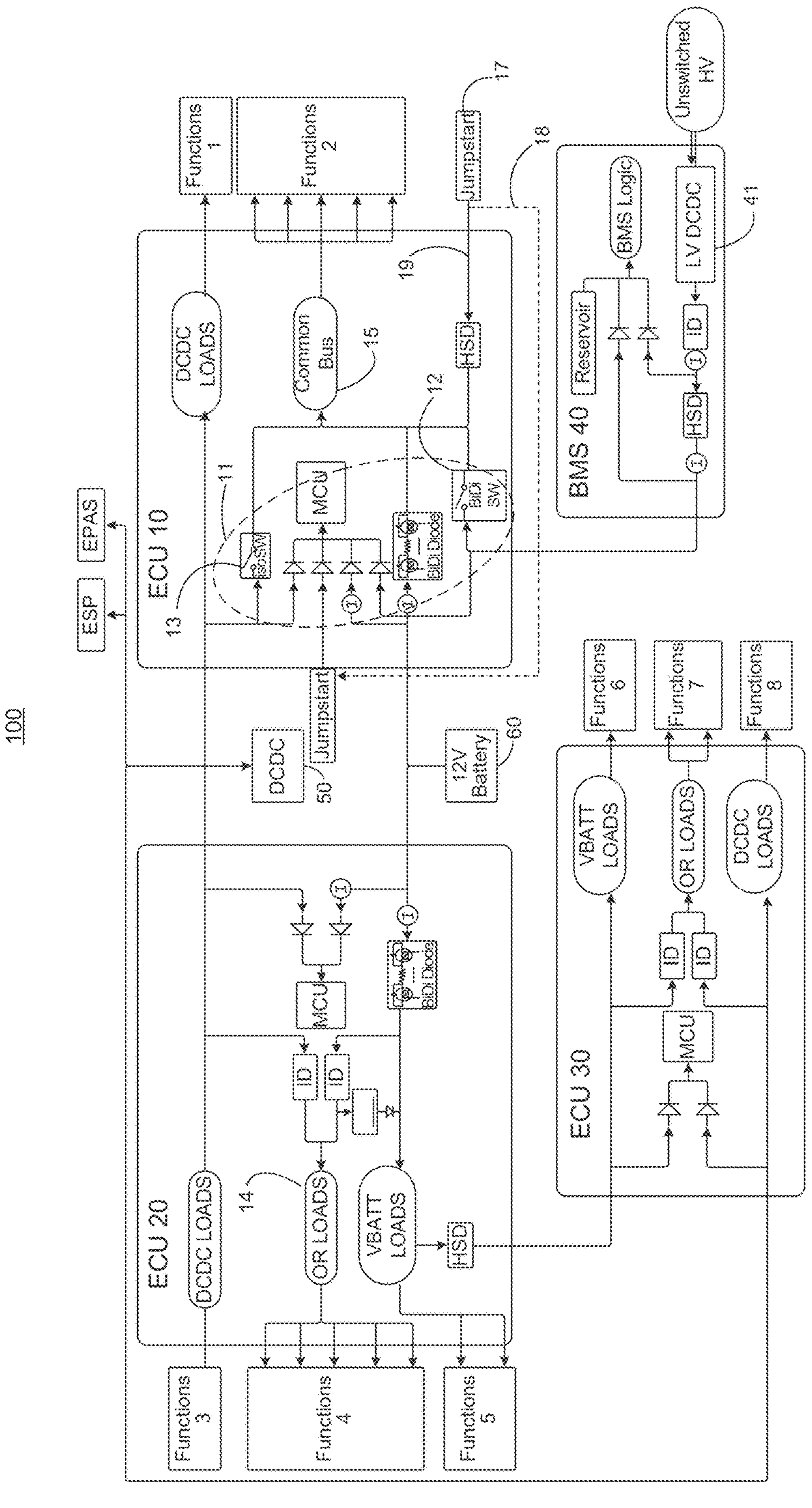
FIG. 1C illustrates an example block diagram of a system with zonal power distribution as described herein.

FIG. 1C illustrates an example block diagram of system 100 that may include a plurality of ECUs of vehicle 300. An ECU is an embedded system that may control one or more of the electrical systems or subsystems in a vehicle. The positioning and connections of ECU 10, ECU 20, or ECU 30 may provide for a level of redundancy for faults, which may be caused by collisions or other malfunctions. The design of system 100 may allow vehicle 300 to safely operate for a period after the fault, such as being able to drive vehicle 300 (e.g., steer, brake, or accelerate) to a safe position off of a roadway or being able to operate electronic controlled functions (e.g., door latches) of vehicle 300, among other things. As shown, ECU 10, ECU 20, and ECU 30 may be connected with DCDC 50 (also referred herein as DCDC bus 50) to operate DCDC loads and a low voltage (LV) battery 60 (e.g., 12V battery or LV battery bus 60) to operate LV battery loads. In an example, one or more ECUs (e.g., ECU 10) may include a fault isolation system 11. Fault isolation system 11 may include isolation switch 13 or a bidirectional (Bidi) switch 12. In some configurations, in consideration of safety, only one ECU (e.g., ECU 10) may include fault isolation system 11. As shown, ECU 10 may include a common bus 15, which may operate slightly differently than other buses (e.g., OR load bus 14), as the common bus may allow for bidirectional power to be transmitted to and from LV battery 60 that may be a function of using fault isolation system 11. The common bus (specific to ECU 10) allows power to flow bidirectionally, from LV battery 60 to DCDC 50, or from DCDC 50 to LV battery 60. The OR bus does not allow power to flow bidirectionally (it does not connect or isolate LV battery 60 and DCDC 50 networks). The other element, which is a shared attribute of both common bus and OR Bus, that in the event of a failure of the DCDC 50 or LV battery 60, the common bus (or OR Bus) will retain operation (e.g., will be available).

With continued reference to FIG. 1C, each ECU may have on or more dedicated functions that may be powered by DCDC 50, LV battery 60, or LV DCDC 41. ECU 10 may operate functions 1, functions 2, and jumpstart functions. ECU 10 may be connected with jumpstart access 17 (e.g., wiring located in a rear portion 340 of vehicle 300). Jumpstart access 17 may allow an external power source (e.g., jumpstart pack) to connect with ECU 10 in order to jumpstart electronic functions of the vehicle, particularly when LV battery 60 is depleted. As further described herein, jumpstart access 17 may have multiple routes that include jumpstart route 18 (e.g., to microcontroller) and jumpstart route 19 (e.g., to Bidi switch 12). Functions 1 may include functions such as first row universal serial bus, or electronic stability program (ESP), among other things. Functions 2 may include functions such as right door latch, passenger seat motor, right headlamp, alarm module, or frunk latch, among other things. In this example, functions 1 of ECU 10 may only be powered by DCDC 50, while functions 2 of ECU 10 may be powered by DCDC 50 (which may be the primary power) or LV battery 60 (which may be the secondary power), which may be referred to common bus 15. ECU 10 may be located on the right front of vehicle 300 and therefore may operate functions primarily for the right portion of vehicle 300.

As shown in FIG. 1C, ECU 20 may operate functions 3, functions 4, and functions 5. Functions 3 may include functions such as front suspension valves, or autonomy control module, among other things. Functions 4 may include functions such as steering angle sensor, front wiper motor, left door latches, left headlamp, exterior near field communication (NFC), or on-board diagnostics (OBD) port, among other things. Functions 5 may include functions such as electric power assisted steering (EPAS), charge port door, interior NFC, or electric powered assisted breaking, among other things. In this example, functions 3 of ECU 20 may only be powered by DCDC 50 and functions 5 of ECU 20 may only be powered by LV battery 60. Functions 4 of ECU 20 may be powered by DCDC 50 (which may be the primary power) or LV battery 60 (which may be the secondary power), which may be referred to OR loads 14 (also referred herein as OR load bus 14). ECU 20 may be located on the left front of vehicle 300 and therefore may operate functions primarily for the left portion of vehicle 300.

As shown in FIG. 1C, ECU 30 may operate functions 6, functions 7, and functions 8. Functions 6 may include functions such as license plate lamp. Functions 7 may include functions such as rear vehicle access system sensors, liftgate latch, trailer brake, right lamp rear, or left lamp rear, among other things. Functions 8 may include functions such as right trailer brake lamp, or rear suspension valves, among other things. In this example, functions 8 of ECU 30 may only be powered by DCDC 50 and functions 6 of ECU 30 may only be powered by LV battery 60. Functions 7 of ECU 20 may be powered by DCDC 50 (which may be the primary power) or LV battery 60 (which may be the secondary power). ECU 20 may be located on the left front of vehicle 300 and therefore may operate functions primarily for the left portion of vehicle 300.

System 100 of FIG. 1C may include a battery management system (BMS) 40. BMS 40 may be located at or near HV battery pack 310 of FIG. 1B, which LV DCDC 41 converts the HV DC to a lower voltage, such as 14V. LV DCDC 41 may help reduce the need for LV battery 60 for some operations, such as when vehicle 300 is in standby mode (e.g., parked). It is contemplated that the functions disclosed herein (e.g., functions 1 through functions 8) may be controlled by other ECUs or powered by any of the listed power sources.

Figure 2:
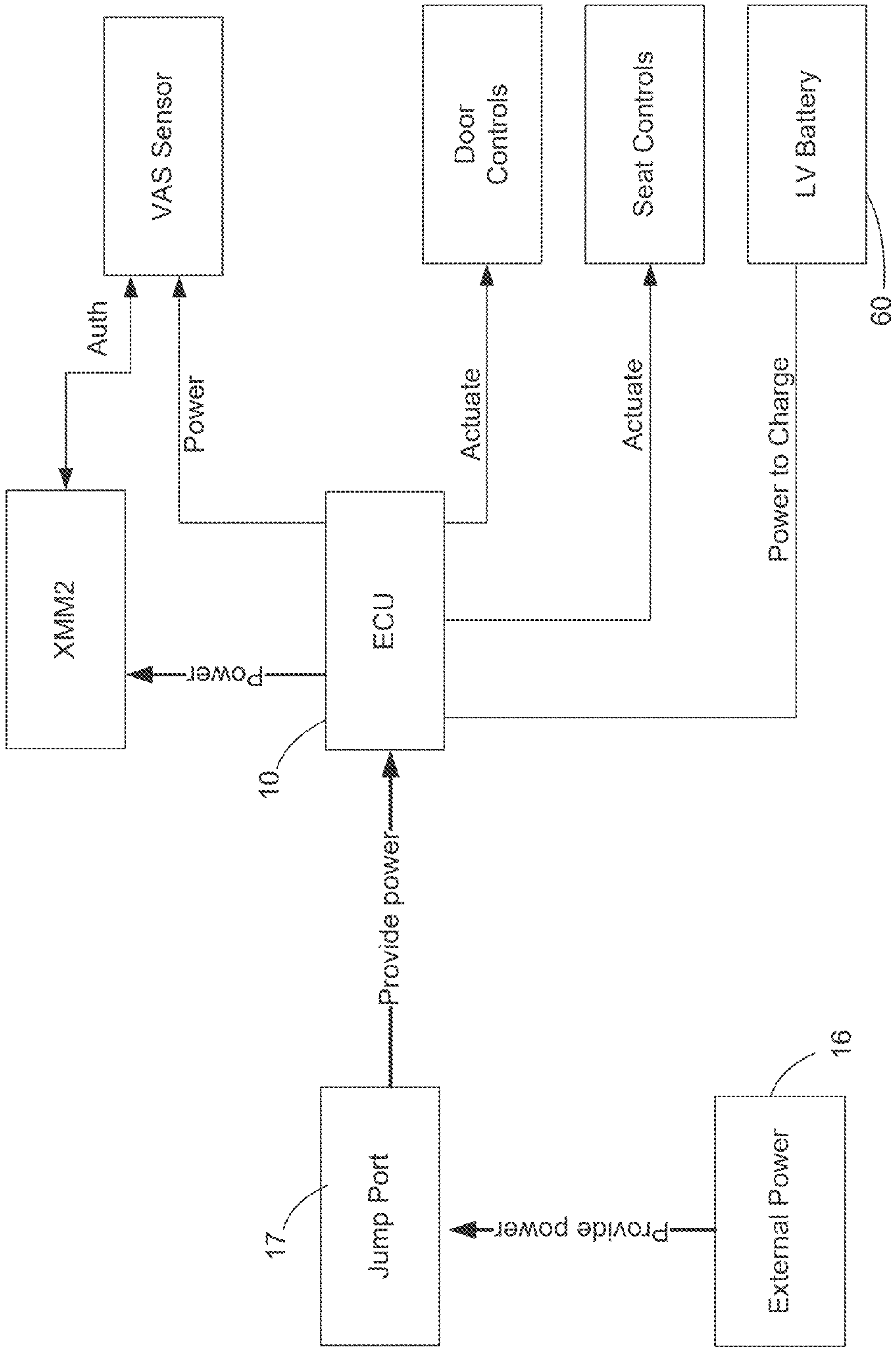
FIG. 2 illustrate an example block diagram associated with electronic control unit (ECU) jumpstart as disclosed herein.

FIG. 2 illustrate an example block diagram associated with ECU jumpstart as disclosed herein. As shown, jumpstart access 17 may be connected with external power source 16 (e.g., jumpstart pack) to provide power to ECU 10. ECU 10 may consider additional factors, as disclosed herein, to operate one or more functions, such as charging LV battery 60, enabling sensors, enabling authentication routines, enabling door controls, or enabling seat controls, among other things.

Figure 3:
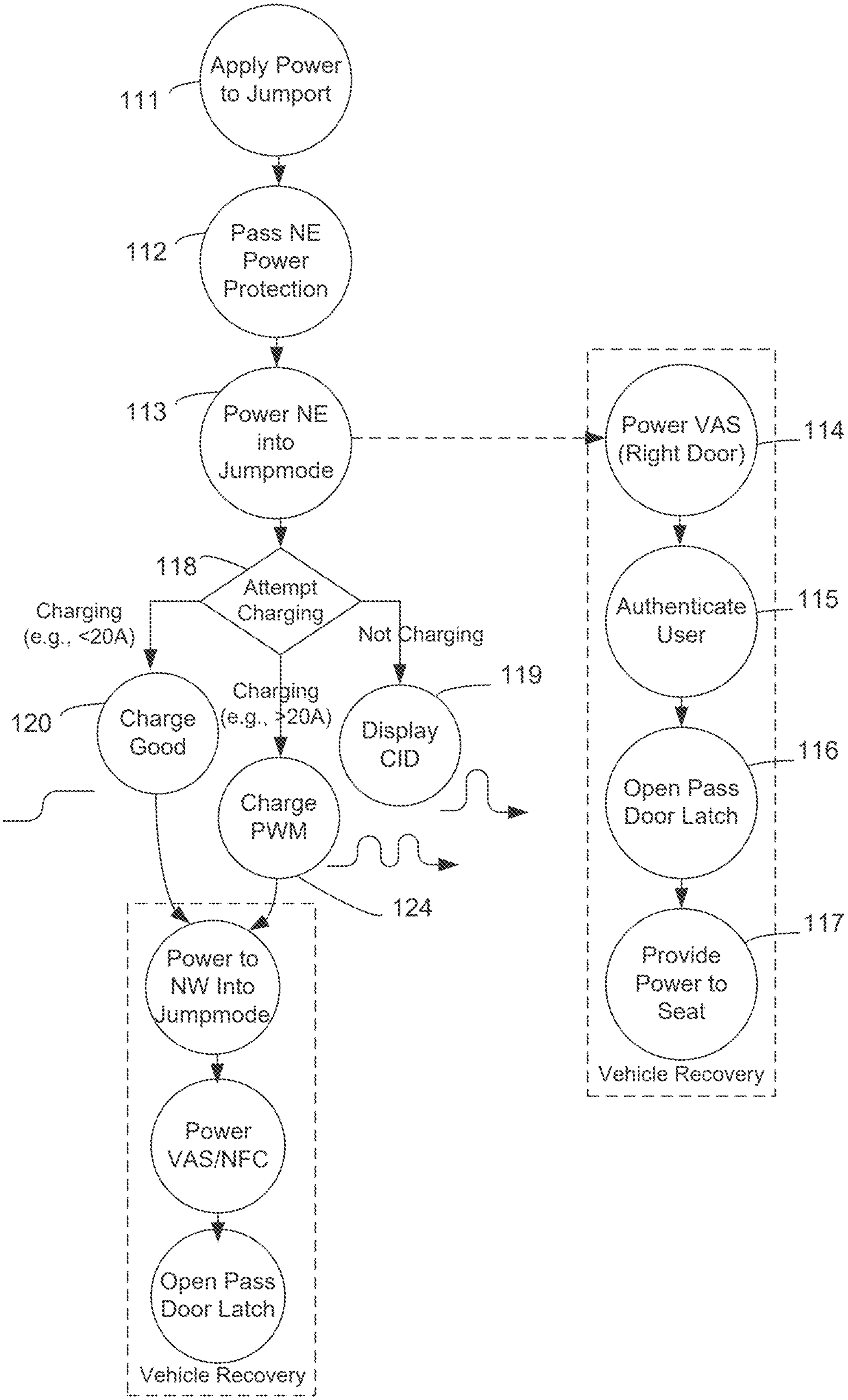
FIG. 3 illustrates an example method for implementing ECU jumpstart as disclosed herein.

FIG. 3 illustrates an example method for implementing ECU jumpstart as disclosed herein. At step 111, external power 16 is applied through jumpstart access 17. At step 112, ECU 10 does diagnostics on the power it receives from step 111 and power protection protocols are passed to allow power to be transmitted to ECU 10 (e.g., power is okay for ECU to receive or distribute to other components). The circuits on an ECU (e.g., ECU 10) may confirm that the polarity of the external source is correct.

At step 113, based on determining that the power is acceptable, ECU 10 may execute jumpstart mode steps (e.g., step 114 through step 117). At step 114, vehicle access system (VAS) may be powered and activated in attempt to authenticate a user (e.g., user profile). At step 115, using the VAS, the nearby user may be authenticated based on mobile phone application, key fob, NFC card, NFC band, or the like. At step 116, based on the user being authenticated one or more latches (e.g., door, trunk, frunk, or other latches) may be activated to allow access to vehicle 300. At step 117, power may be provided to the seats. LV Battery 60 may be packaged underneath the front passenger seat. The easiest method to recover the vehicle is to power the seat, so that the seat movement controls will function. The user (or the service tech, etc.) may then move the seat fully upwards and fully rearwards in order to gain access to the LV battery 60 and may replace it or connect a battery charger of some sort.

With continued reference to FIG. 3, at step 118, ECU 10 may determine whether to charge LV battery 60. ECU 10 may run diagnostics on the health of LV battery 60 to determine whether to charge (e.g., step 120 through 124) or not (e.g., step 119). ECU 10 makes a determination if it has the capability to charge the LV battery 60. If the LV battery 60 is able to accept charge (e.g., because the battery is healthy enough, or because the external power 16 is robust enough, or both), then the ECU 10 may make the determination to transition to Step 120, 124, or 119. If ECU 10 determines that the battery is not in a preferred state to charge, then, at step 119, a display of vehicle 300 may indicate that ECU 10 will not charge or recommend swapping LV battery 60.

ECU 10 may determine to charge LV battery 60 in a particular manner at step 120 or step 124. ECU 10, based on diagnostics, may charge LV battery 60 in a controlled way to optimize charging. The diagnostics may be based on use of voltage, current, or temperature monitoring circuits to check that charging is within threshold parameters. When in threshold parameters, jumpstart route 19 may be activated by switching Bidi switch 12 to allow power to route to LV battery 60. The ECU 10 may progress to step 120 if the LV Battery 60 and external power 16 are able to support a "high" charge current. The ECU 10 may progress to Step 124 if the LV Battery 60 or the external power 16 cannot support high charge currents, but are able to accept some charging.

The methods, systems, or apparatuses disclosed herein may be incorporated into electric vehicles or other devices. The methods, systems, or apparatuses disclosed herein may be incorporated into products, such as various feature specific electronic control units (ECUs) or microcontrollers.

Methods, systems, and apparatus for jumpstart functionality are disclosed herein. The disclosed subject matter may provide for mechanisms to isolate a dead or faulted LV battery while powering the rest of a vehicle, which may allow for opening latches (e.g., allow for ability to retrieve belongings from the vehicle), move seats, power displays, or other interactions with the vehicle. An apparatus may include an electronic control unit (ECU) with a bidirectional switch and jumpstart access port wiring connected to the ECU. The apparatus may further include a jumpstart access port connected to the wiring and located at the rear of a vehicle. This port can connect with the bidirectional switch, a microcontroller in the ECU, and an external power source. The bidirectional switch may connect to a low voltage battery and a battery management system of the vehicle. The ECU may include a common bus connected to the jumpstart access port and operate jumpstart-related functions such as enabling door latches, passenger seat motors, headlamps, alarm modules, or frunk latches. A method for utilizing this system may involve receiving external power from the jumpstart access port, determining if the power is acceptable for the ECU or connected functions, authenticating a user profile, and activating vehicle components like latches or power seats based on authentication. The method may also involve switching the bidirectional switch to charge the low voltage battery with external power, potentially after determining the battery's health. A vehicle incorporating this system may include a direct current to direct current converter (DCDC) and a low voltage (LV) battery connected to ECU components, along with the jumpstart access port connected to the ECU. An indication may be displayed that the ECU will not charge the low voltage battery or recommending battery replacement if the low voltage battery is determined to be in an unsuitable state for charging (e.g., unhealthy). All combinations, including the removal or addition of elements, are contemplated in a manner consistent with other portions of the detailed description.

As used herein, the phrase "at least one of" preceding a series of items, with the term "and" or "or" to separate any of the items, modifies the list as a whole, rather than each member of the list (i.e., each item). The phrase "at least one of" does not require selection of at least one of each item listed; rather, the phrase allows a meaning that includes at least one of any one of the items, and/or at least one of any combination of the items, and/or at least one of each of the items. By way of example, the phrases "at least one of A, B, and C" or "at least one of A, B, or C" each refer to only A, only B, or only C; any combination of A, B, and C; and/or at least one of each of A, B, and C.

When an element is referred to herein as being "connected" or "coupled" to another element, it is to be understood that the elements can be directly connected to the other element, or have intervening elements present between the elements. In contrast, when an element is referred to as being "directly connected" or "directly coupled" to another element, it should be understood that no intervening elements are present in the "direct" connection between the elements. However, the existence of a direct connection does not exclude other connections, in which intervening elements may be present.

The predicate words "configured to", "operable to", and "programmed to" do not imply any particular tangible or intangible modification of a subject, but, rather, are intended to be used interchangeably. In one or more implementations, a processor configured to monitor and control an operation or a component may also mean the processor being programmed to monitor and control the operation or the processor being operable to monitor and control the operation. Likewise, a processor configured to execute code can be construed as a processor programmed to execute code or operable to execute code.

Phrases such as an aspect, the aspect, another aspect, some aspects, one or more aspects, an implementation, the implementation, another implementation, some implementations, one or more implementations, an embodiment, the embodiment, another embodiment, some embodiments, one or more embodiments, a configuration, the configuration, another configuration, some configurations, one or more configurations, the subject technology, the disclosure, the present disclosure, other variations thereof and alike are for convenience and do not imply that a disclosure relating to such phrase(s) is essential to the subject technology or that such disclosure applies to all configurations of the subject technology. A disclosure relating to such phrase(s) may apply to all configurations, or one or more configurations. A disclosure relating to such phrase(s) may provide one or more examples. A phrase such as an aspect or some aspects may refer to one or more aspects and vice versa, and this applies similarly to other foregoing phrases.

The word "exemplary" is used herein to mean "serving as an example, instance, or illustration". Any embodiment described herein as "exemplary" or as an "example" is not necessarily to be construed as preferred or advantageous over other embodiments. Furthermore, to the extent that the term "include", "have", or the like is used in the description or the claims, such term is intended to be inclusive in a manner similar to the term "comprise" as "comprise" is interpreted when employed as a transitional word in a claim.

All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112, sixth paragraph, unless the element is expressly recited using the phrase "means for" or, in the case of a method claim, the element is recited using the phrase "step for".

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but are to be accorded the full scope consistent with the language claims, wherein reference to an element in the singular is not intended to mean "one and only one" unless specifically so stated, but rather "one or more". Unless specifically stated otherwise, the term "some" refers to one or more. Pronouns in the masculine (e.g., his) include the feminine and neuter gender (e.g., her and its) and vice versa. Headings and subheadings, if any, are used for convenience only and do not limit the subject disclosure.

What is claimed is:

1. An apparatus comprising:

an electronic control unit (ECU), wherein the ECU comprises a bidirectional switch; and a jumpstart access port connected with the ECU, wherein the apparatus is configured to:

receive external power via the jumpstart access port, based on receiving power via the jumpstart access port, determine that power is acceptable for ECU or one or more functions connected with the ECU;

based on determining the power is acceptable, authenticating a user profile; and activating one or more components of the apparatus based on the user profile being authenticated, wherein the one or more components comprises one or more latches.

2. The apparatus of claim 1, further comprising a jumpstart access port wiring connected with the ECU, wherein the jumpstart access port is connected with the jumpstart access port wiring, wherein the jumpstart access port is located at a rear of a vehicle.

3. The apparatus of claim 2, wherein the jumpstart access port comprises a connection with the bidirectional switch.

4. The apparatus of claim 2, wherein the ECU comprises a microcontroller, wherein the jumpstart access port comprises a connection with the microcontroller.

5. The apparatus of claim 2, wherein the jumpstart access port is configured to connect with an external power source.

6. The apparatus of claim 1, wherein the bidirectional switch comprises a connection with a low voltage battery of a vehicle.

7. The apparatus of claim 1, wherein the bidirectional switch comprises a connection with a battery management system of a vehicle.

8. The apparatus of claim 1, wherein the ECU comprises a common bus, wherein the jumpstart access port connects with the common bus.

9. The apparatus of claim 1, wherein the ECU operates jumpstart related functions, the jumpstart related functions comprise enabling a door latch, a passenger seat motor, a headlamp, an alarm module, or frunk latch.

10. A method comprising:

receiving external power from a jumpstart access port;

based on receiving power from the jumpstart access port, determining that power is acceptable for an electronic control unit or one or more functions connected with the electronic control unit;

based on determining the power is acceptable, authenticating a user profile; and activating one or more components of a vehicle based on the user profile being authenticated, wherein the one or more components comprises one or more latches.

11. The method of claim 10, wherein acceptable is indicative of being within a threshold voltage.

12. The method of claim 10, wherein acceptable is indicative of being within a threshold current.

13. The method of claim 10, further comprising switching a bidirectional switch to activate charging of a low voltage battery by the external power.

14. The method of claim 10, wherein the method is executed by one or more second components of the electronic control unit.

15. The method of claim 10, wherein the one or more components comprise one or more power seats of the vehicle.

16. The method of claim 10, further comprising:

determining a health of a low voltage battery; and based on the determining the health of the low voltage battery, activating a bidirectional switch to enable charging of the low voltage battery by the external power.

17. A vehicle comprising:
a direct current to direct current converter (DCDC);
a low voltage (LV) battery;
an electronic control unit (ECU),
wherein the ECU comprises a bidirectional switch, wherein the DCDC and the LV battery are connected with one or more components of the ECU; and
a jumpstart access port connected with the ECU,
wherein the ECU is configured to:
receive external power via the jumpstart access port,
based on receiving power via the jumpstart access port, determine that power is acceptable for ECU or one or more functions connected with the ECU;
based on determining the power is acceptable, authenticating a user profile; and activating one or more components of the apparatus based on the user profile being authenticated, wherein the one or more components comprises one or more latches.

18. The vehicle of claim 17, wherein the jumpstart access port comprises a connection with the bidirectional switch.

19. The vehicle of claim 17, wherein the ECU comprises a microcontroller, wherein the jumpstart access port comprises a connection with the microcontroller.

20. The vehicle of claim 17, wherein the jumpstart access port is configured to connect with an external power source.

* * * * *